United States Patent
Einig et al.

(10) Patent No.: US 8,930,588 B2
(45) Date of Patent: Jan. 6, 2015

(54) CONTROL DEVICE, INPUT/OUTPUT DEVICE, CONNECTION SWITCH DEVICE AND METHOD FOR AN AIRCRAFT CONTROL SYSTEM

(75) Inventors: Johannes Einig, Hamburg (DE); Claus-Peter Gross, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 128 days.

(21) Appl. No.: 13/421,574

(22) Filed: Mar. 15, 2012

(65) Prior Publication Data

US 2012/0233495 A1    Sep. 13, 2012

Related U.S. Application Data (63) Continuation of application No. PCT/EP2010/063376, filed on Sep. 13, 2010.

(60) Provisional application No. 61/242,620, filed on Sep. 15, 2009.

(30) Foreign Application Priority Data

Sep. 15, 2009    (DE) .................. 10 2009 041 599

(51) Int. Cl.
| | | |
|---|---|---|
| G06F 3/00 | (2006.01) |
| H04L 29/08 | (2006.01) |
| G06F 11/16 | (2006.01) |
| G06F 11/20 | (2006.01) |
| H04L 12/24 | (2006.01) |
| H04L 12/701 | (2013.01) |
| H04L 29/14 | (2006.01) |

(52) U.S. Cl.
CPC .......... *H04L 67/125* (2013.01); *G06F 11/1658* (2013.01); *G06F 11/2025* (2013.01); *G06F 11/2038* (2013.01); *H04L 41/0806* (2013.01); *H04L 45/00* (2013.01); *H04L 67/34* (2013.01); *H04L 67/303* (2013.01); *H04L 67/12* (2013.01); *H04L 67/1002* (2013.01); *H04L 69/40* (2013.01)
USPC .......................................... 710/16; 340/945

(58) Field of Classification Search
None
See application file for complete search history.

(56) References Cited

U.S. PATENT DOCUMENTS

| | | |
|---|---|---|
| 5,223,788 A | 6/1993 | Andreano et al. |
| 5,623,411 A | 4/1997 | Morvan |
| 5,901,320 A | 5/1999 | Takahashi et al. |
| 6,584,382 B2 | 6/2003 | Karem |
| 6,654,685 B2 | 11/2003 | McIntyre |

(Continued)

FOREIGN PATENT DOCUMENTS

| | | |
|---|---|---|
| EP | 0073078 A2 | 3/1983 |
| GB | 2311389 A | 9/1997 |
| WO | 02079985 A2 | 10/2002 |

OTHER PUBLICATIONS

Non-Final Office Action Mailed May 24, 2013 for U.S. Appl. No. 13/421,579.

(Continued)

*Primary Examiner* — Elias Mamo
(74) *Attorney, Agent, or Firm* — Ingrassia Fisher & Lorenz, P.C.

(57) ABSTRACT

Methods and apparatus are described for an aircraft network that permits an automatic configuring and/or repairing of the network.

14 Claims, 6 Drawing Sheets

(56) References Cited

U.S. PATENT DOCUMENTS

| | | | |
|---|---|---|---|
| 6,654,910 | B1 | 11/2003 | Eibach et al. |
| 6,664,656 | B2 | 12/2003 | Bernier |
| 6,671,589 | B2 * | 12/2003 | Holst et al. ............... 701/3 |
| 6,788,935 | B1 | 9/2004 | McKenna et al. |
| 6,973,479 | B2 | 12/2005 | Brady, Jr. et al. |
| 7,016,957 | B2 | 3/2006 | Morimoto et al. |
| 7,437,494 | B2 | 10/2008 | Ellerbrock |
| 7,469,279 | B1 | 12/2008 | Stamler et al. |
| 7,802,127 | B2 | 9/2010 | Katano et al. |
| 7,864,704 | B2 * | 1/2011 | Lee et al. ............... 370/254 |
| 8,010,288 | B2 | 8/2011 | Bouchet et al. |
| 8,073,443 | B2 | 12/2011 | Wahler et al. |
| 8,081,969 | B2 | 12/2011 | Lauer et al. |
| 8,145,789 | B1 * | 3/2012 | Stamler et al. ............ 709/244 |
| 8,255,095 | B2 | 8/2012 | Girlich |
| 8,301,867 | B1 | 10/2012 | Mazuk et al. |
| 2002/0144010 | A1 | 10/2002 | Younis et al. |
| 2002/0174173 | A1 | 11/2002 | Gunturu |
| 2003/0047997 | A1 * | 3/2003 | Bernier ............... 307/9.1 |
| 2003/0208579 | A1 | 11/2003 | Brady, Jr. et al. |
| 2004/0078632 | A1 * | 4/2004 | Infante et al. ............ 714/5 |
| 2006/0233204 | A1 * | 10/2006 | Pomaranski et al. ..... 370/535 |
| 2008/0071635 | A1 * | 3/2008 | Ong ............... 705/26 |
| 2008/0127159 | A1 * | 5/2008 | Regenmorter ............ 717/168 |
| 2008/0133963 | A1 | 6/2008 | Katano et al. |
| 2008/0181169 | A1 | 7/2008 | Lauer et al. |
| 2009/0076728 | A1 | 3/2009 | Bouchet et al. |
| 2009/0197596 | A1 | 8/2009 | Wahler et al. |
| 2009/0240840 | A1 | 9/2009 | Habben et al. |
| 2010/0198576 | A1 | 8/2010 | Dessertenne |

OTHER PUBLICATIONS

Lee, Yann-Hang et al., "An Integrated Scheduling Mechanism for Fault-Tolerant Modular Avionics Systems", Aerospace Conference, 1998 IEEE.

Fraboul, Christian et al., "Modeling and Simulation of Integrated Modular Avionics", 1998 IEEE.

Grabowski, G. et al., "Integrated Modular Avionics with COTS directed to Open Systems and Obsolescence Management", RTO SCI Symposium, held in Budapest, Hungary, Oct. 23-25, 2000.

Watkins, Christopher B., "Integrated Modular Avionics—Managing the Allocation of Shared Intersystem Resources", 2006 IEEE.

German Patent Office, German Office Action dated May 18, 2010 for German Patent Application No. 10 2009 041 599.8.

Henning Butz, "The Airbus Approach to Open Integrated Modular Avionics (IMA): Technology, Methods, Processes and Future Road Map", Department of Information Systems Architecture & Integration, Airbus SAS, Workshop on Aircraft System Technologies, Mar. 29-30, 2007, Hamburg, Germany.

Black et al., Simplified Robotics Avionics System: A Integrated Modular Architecture Applied Across a Group of Robotic Elements, Honeywell International, DSES, 2006, Glendale, Arizona.

Condor Engineering, Inc., "ARINC Protocol Tutorial Manual", Jun. 7, 2000, pp. 1-15; 22, Santa Barbara, CA.

International Searching Authority, International Search Report dated Jan. 3, 2011 for International Application No. PCT/EP2010/063376.

International Searching Authority, International Search Report dated Jun. 8, 2011 for Application No. PCT/EP2010/063376.

Benveniste, A., Network of Excellence on Embedded Systems Design, Artist2 Workshop on Integrated Modular Avionics, Nov. 12, 2007, pp. 10-12; 15, Rome.

Doehmen, G., Processes and Methods for Integrated Modular Avionics, Presentation at USA-EU Workshop, Airbus, Jul. 7, 2005, pp. 4-6, Paris.

Arinc, AFDX/ARINC 664 Tutorial (1500-049), [online], Acal Technology, May 2005, pp. 9; 20-21; 24-26, Retrieved from Internet: <URL:www.acalmicrosystems.co.uk/whitepapers/sbs8.pdf?PHPSESSID=bd030f1b97f284d41ec00cf1ea2d5226>.

Anonymous, AFDX/ARINC 664 Tutorial, [online], TechSAT, Aug. 29, 2008, pp. 7; 11-15; 17-19; 25, Retrieved from Internet: <URL:www.techsat.com/fileadmin/media/pdf/infokiosk/TechSAT_TUT-AFDX EN.pdf>.

Land, I.; Elliot, J., Architecting ARINC 664, Part 7 (AFDX) Solutions, Application Note: Virtex-4 and Virtex-5 FPGSs, XILINX, XAPP1130, May 22, 2009, pp. 1-6; 9-11, Version 1.0.1, Retrieved from Internet: <URL:www.xilinx.com/support/documentation/application_notes/xapp1130.p>.

Francois, G. R. P., Study on I/O in Time and Space Partitioned Systems, XP007918704, NLR-CR-2008-531-PT-1, Nov. 1, 2008, Paragraph 4.3.3; Paragraph 5.1.1; Paragraphs 0B.1-0B.2; Illustrations 5.1, 9.2, Part 1, Issue 2.

USPTO, Final Office Action Mailed Oct. 28, 2013 for U.S. Appl. No. 13/421,579.

Response to Non-Final Office Action Mailed Aug. 22, 2013 for U.S. Appl. No. 13/421,579.

USPTO, Office Action for U.S. Appl. No. 13/421,579 mailed Jun. 6, 2014.

Response to Final Office Action for U.S. Appl. No. 13/421,579 mailed Feb. 26, 2014.

USPTO: Notice of Allowance for U.S. Appl. No. 13/421,579 mailed Nov. 4, 2014.

Response to Office Action for U.S. Appl. No. 13/421,579, filed Oct. 6, 2014.

* cited by examiner

CONTROL DEVICE, INPUT/OUTPUT DEVICE, CONNECTION SWITCH DEVICE AND METHOD FOR AN AIRCRAFT CONTROL SYSTEM

CROSS-REFERENCE TO RELATED APPLICATIONS

This is a continuation of International Application No. PCT/EP2010/063376, filed Sep. 13, 2010, which claims priority to German Application No. 10 2009 041 599.8, filed Sep. 15, 2009, and also claims priority to US Provisional Application No. 61/242,620, filed Sep. 15, 2009, the disclosures of which are hereby incorporated herein by reference in their entirety.

TECHNICAL FIELD

The technical field relates to aircraft technology and in particular a signal transmission device for exchanging signals between systems or devices in an aircraft. Furthermore, the technical field relates to a control device for an aircraft network, a method for controlling an aircraft network, an input/output device for an aircraft network, a method for identifying an input/output device, a connection switching device, a method for identifying an input/output device in a connection switching device and a program element for carrying out the methods.

BACKGROUND

In an aircraft, for example in an Airbus A380, a network may be installed, which may connect various devices with each other within the aircraft. Such an aircraft network may be denoted as ADCN (Aircraft Data Communication Network). Various devices, which may comprise a processing unit with its own software and its own processor, may be connected to such a network. These devices may be denoted as CPIOM (Core Processing Input Output Module).

The processing units or CPIOMs may carry out different programs or applications simultaneously. The respective program software for the application may be loaded manually through the network (ADCN) after the installation of the processing unit in the aircraft, i.e., after the processing unit has been integrated into the network. The software which is loaded onto the corresponding CPIOMs may be taken from storage. Alternatively, a processing unit (CPIOM) may be stored with pre-installed software, and the software may be pre-loaded in the workshop or may be loaded into or onto the CPIOM.

The storage of pre-installed CPIOM modules may make it necessary for a number of different processing units or CPIOMs to stored, which due to the different software may also comprise different item numbers or part numbers. For example, one aircraft may have seven different processing units and thus seven different part numbers. Because of the pre-configuration, the processing units of the CPIOMs may not be interchangeable.

In view of the foregoing, there may at least a need for providing an efficient operating of an aircraft network. In addition, other needs, desirable features and characteristics will become apparent from the subsequent summary and detailed description, and the appended claims, taken in conjunction with the accompanying drawings and this background.

SUMMARY

According to an embodiment a control device is provided for an aircraft network, a method is provided for controlling an aircraft network, an input/output device is provided for an aircraft network, a method is provided for identifying an input/output device, a connection switching device, a method for identifying an input/output device and a program element are provided in accordance with embodiments.

According to an embodiment, the control device for an aircraft network may comprise an application determination device and an application provision device. The application determination device may be adapted for detecting an unconfigured input/output device in the aircraft network and for determining at least one application which relates to the unconfigured input/output device or which is connected to the unconfigured input/output device. The application provision device may be adapted for providing a program (software), which corresponds to the at least one application, for uploading the program on the unconfigured input/output device and thereby configuring the substantially unconfigured input/out device.

In other words, the control device may monitor the input/output device and if the control device establishes that an unconfigured input/output device is connected to the aircraft network, the control device may determine which input/output device it is or which type of input/output device it is. With information on the type of the input/output device, the control device may be in a position to provide the respective input/output device with the corresponding software or the corresponding program. The control device may then automatically upload the program onto an input/output device, such that the input/output device may be used in the aircraft network, substantially without the necessity of any manual intervention.

According to another embodiment, a method for controlling an aircraft network may be described, which may initially comprise detecting an unconfigured input/output device in the aircraft network and determining at least one application which may relate to the unconfigured input/output device or which may be associated with the unconfigured input/output device. Further, the method may allow for providing a program which corresponds to at least one determined or identified application and for uploading or downloading this program onto the unconfigured input/output device. In this way, the input/output device may be configured and integrated into the operation of the network.

The application provision device and the application determination device may be arranged in a common housing of the control device. Alternatively, the application provision device and the application determination device may be arranged as separate devices between which devices an exchange of information may take place. In order to detect the association of an application to an input/output device and vice versa, for example an assignment table or a data base may be used. In this table a correlation between one type of an input/output device and an application and vice versa may be stored. However, also a certain input/output device may be interrelated with exactly one or a number of applications. A certain input/output device or an application may be characterised by an individual feature which may allow for an interrelation to be made. Such an individual feature may be a serial number, a key, a name, a reference or a codification. For an application, the individual feature may be an application identifier and for an input/output device the individual feature may be an input/output device identifier.

Furthermore, according to another embodiment, an input/output device for an aircraft network may be presented, which comprises a first identification device. The first identification device may be adapted for communicating at least one application running on the input/output device or the type thereof to a control device and/or a connection switching device. The communicating may be initiated by a trigger on the input/output device. Alternatively, the application may be communicated, after an external query (polling), which may be directed from the connection switching device or from the control device to the input/output device. The communication is made by the input/output device to the respective device carrying out the query. The detecting of the application may take place in the input/output device.

According to another embodiment, a method is described for identifying an input/output device. In this method, at least one application or at least one type of an application or at least one reference of an application, which is running on the input/output device, may be communicated to a control device or to a connection switching device. In this way, the control device of the connection switching device may be able to provide the at least one application, which is running or is supposed to run on the input/output device. For determining the application, for example substantially only the individual identifier of the input/output device may be determined and passed to a control device and/or the connection switching device. The individual identifier may be provided by the input/output device. Alternatively, the individual identifier may be provided by a device which may be arranged outside the input/output device. In another example, the input/output device may determine the application associated with said input/output device and transmit the respective application identifier to the control device.

According to yet another embodiment, a connection switching device may be indicated, which comprises a second identification device. The second identification device may be adapted for detecting an input/output device which may be connected to the connection switching device and for determining the type of input/output device and communicating it to the control device. The second identification device may differ from the first identification device.

According to another embodiment, a method may be described which comprises the detection of an input/output device in a connection switching device. The input/output device may be connected to the connection switching device.

According to yet another embodiment, a program element may be indicated, which is adapted for carrying out at least one method selected from a group of methods when executed by a processor. The group comprising a method for controlling an aircraft network, the method for identifying an input/output device and the method for identifying an input/output device in the connection switching device.

According to yet another embodiment, a computer readable storage medium may be described, which comprises a program code, which program code may carry out at least one method when executed by a processor, which method is selected form the group of methods comprising the method for controlling an aircraft network, the method according for identifying an input/output device and the method according for identifying an input/output device in the connection switching device.

A computer readable storage medium may be a floppy disk, a hard disk, a hard drive, a USB (Universal Serial Bus) storage medium, an RAM (Random Access Memory), an ROM (Read Only Memory) or an EPROM (Erasable Programmable Read Only Memory). A computer readable storage medium may also denote a data communication network, such as for example the Internet, which may allow the downloading of a program code.

In order to counteract a system failure in an aircraft network, a corresponding redundancy may be available in the aircraft network. A redundancy may be achieved by the availability of several identical components in the aircraft network and by taking over the function of a component that fails by the identical components.

If the at least one application is separated from the hardware platform or from the hardware component on which it runs, it may be avoided to retain differently configured devices or systems as redundant systems. Thus, it may be avoided to retain a particular hardware configured with an application, for each application which may fail. If necessary, the configuration of the hardware platform may be carried out depending on the failed applications. Thus, a uniform hardware platform with basic equipment may be provided, on which applications which are necessary for the operation of the aircraft may run. Such applications may be control systems or regulation systems for the air conditioning or for the landing flaps. These applications may be associated to a logical level of application.

By separating the application level from the hardware level, it may no longer be necessary for the same individually configured processing unit or the same CPIOM (Core Processing Input Output Module) with the same software or application to be present several times in the system. In other words, it may no longer be necessary for an individually configured processing unit, that is to say a processing unit on which an application has already been installed or uploaded, to be kept in reserve. The configuration for the replacement components, that is, the uploading of the application, may not take place substantially until a failure occurs, or substantially during installation, after which it may substantially be adapted to the present failure or the present installation of components or of CPIOMs. With the same number of unconfigured components that only are configured in the event of a failure, a larger number of failure combinations may be achieved as compared to the same number of pre-configured components. In the event that all replacement components provided as redundancies are already in use and a further input/output device which may comprise a higher criticality fails, an application which runs on a replacement component and may comprise a lower criticality may be replaced by an application with a higher level of criticality. A separation of the application level and the hardware level may thus make possible the change of application. Thus, the application may be exchanged independently form the hardware platform. A uniform hardware platform may be used for all applications. Before uploading an application, substantially uniform hardware components may be provided as redundant components. Substantially, only with the uploading of the respective application the hardware components may take over the individual function of a failed component or of a failed input/output device. The same may apply for the installation of a component.

The hardware level can provide an interface, a programming interface or an API (Application Programming Interface), which may be accessed by an application. According to an example, the hardware level may comprise a firmware, a middleware and/or an operating system. The hardware level may also be denoted as a hardware layer and the application level may be denoted as an application layer. In this way, different applications may be loaded onto a hardware component or onto an input/output device, which are set on the same basis or on the same hardware level. The applications may be stored as a program code or a program element, as a result of which they substantially have only a small space requirement however they may be reproduced at least once or several times, even on different input/output devices. For example, a single redundancy may be provided for different input/output devices with just a single hardware component. The same may apply for an n-fold or a multiple redundancy.

If the system or the device have an individual configuration, the device, the input/output device or the CPIOM would need to be removed after a failure and replaced by a new device of the same type, that is to say with the same software or application. Because of the multiple existence of part numbers needed to indicate the individual configured equipment or CPIOMs, a storage load may increase.

When the application that is to be configured on an input/output device is detected and the corresponding program is provided through the aircraft network directly from the control device, the loading of the corresponding software via an external data source, such as for example a CD ROM, may be avoided. Uploading of the applications onto the components may take place in a contact-free manner directly with respect to the component. In particular, the manual loading by a technician to load the software or the program may be avoided.

Thus, according to an embodiment, there may be an unconfigured replacement device connected to the network, particularly to the aircraft network, which device may be configured in such a way that it may assume the functions or the applications of any other device, after this other device may have failed. The function may be uploaded from the control device or from the control center onto the replacement device, which is to say onto the redundant input/output device or onto the unconfigured CPIOM. After the uploading of the respective application or of the at least one application, the replacement device may take over the function of a failed device.

Thus, the control device may therefore identify the failed configured processing unit or the configured CPIOM and load software that corresponds to this identified configured CPIOM from an internal memory in the control device. As in one example, the CPIOMs may be designed substantially purely digital, the necessity of providing different part numbers for the software and/or the hardware may be avoided. With the use of non-purely digital CPIOMs, for example, 7 different part numbers may be different not only for the software, but also be different for the hardware, as, for example, different sensors etc. may be connected to the CPIOMs or to the hardware, thus making combinations of hardware and software distinguishable by part numbers.

During the flight, the control device may be able to automatically, i.e., substantially without the intervention of a technician, replace a failed system, for substantially restoring the full functionality of the aircraft. The automatic configuration may be employed not only for error treatment. During the installation, an unconfigured device may also be detected and provided with an application allocated to the device, so that it may be integrated quickly into the network. The uploading of a function of a failed device onto an initially unconfigured device may take place during the flight.

Depending on their importance or criticality, the applications or programs may run redundantly and in parallel on several configured input/output devices. This may imply for example that a critical application, as for example the landing system or a control system for the landing flaps, may run on three independent, separate input/output devices, for providing a threefold redundancy. With such a threefold redundancy, it may be possible for two devices or applications to fail and the function relating to the application, for example, the landing flap function, yet to be substantially provided. However, the redundancy may be reduced, as it may be present one time instead of being threefold.

If an application fails or a device onto which a specific application may be installed, the control device may provide the redundantly available, unconfigured system with a copy of the at least one application of the failed device or CPIOM. In this way, despite the failure of a device, the maximum necessary amount of redundancy may be provided for, as for example in the above example, the availability of three redundant applications is provided for. If this maximum predetermined amount of redundancy is present, a failed device or a failed input/output device may not need to be replaced immediately after a flight. Consequently, the standing time between two flights may not additionally be increased and the maintenance expenditure may thus be reduced.

In other words, in the event of a failure of only one processing unit, the available unconfigured reserve unit or the unconfigured input/output device may take over the function of the failed processing unit and maintain the predetermined redundancy. The control device may be adapted for maintaining the predetermined redundancy by uploading of corresponding applications onto unconfigured components as long as a sufficiently high number of components are available. In one example, not only a single unconfigured input/output device, component, or a single reserve system may be available, but any number of reserve units may be available. For example, the same number of available devices may also be available as a reserve unit. With the use of the control device according to the present invention, the flight operation may be flexible, i.e. the failure of an input/output device substantially may not lead to any limitations in the further flight operation.

Redundancy can be increased virtually. Redundancy may actually be increased by the parallel presence of a maximum predetermined number of redundant devices or applications. The provision of an unconfigured input/output device may increase the redundancy virtually, as in the event of the failure of a system of the actual redundancy, this too may be replaced. The safety of an aircraft equipped with a control device may be increased. Redundancy may also be increased to a level in excess of that stipulated by the flight authorities.

Further, the number of available devices may be reduced in order to arrive at the same redundancy as without the use of the control device, which may result in reducing weight and, cost as fewer devices may be used. If a system that is available for ensuring the actual redundancy fails, the redundancy of the entire system would be either lost or reduced, which may lead to a "downgrading" of the aircraft systems. A downgrading would occur, for example, if, after the failure of an application, only a twofold redundancy instead of a threefold redundancy was available.

According to a further exemplary embodiment, the control device may comprise an error detection device. The error detection device may be adapted for detecting an error in a configured input/output device. A configured input/output device may be understood to be an input/output device that comprises at least one predeterminable application.

The application determination device may be adapted in such a way that, when an unconfigured input/output device is detected, it determines the applications which are provided for this input/output device. The application determination device may be adapted for determining the at least one predeterminable application on a configured input/output device in the event of an error, in such a way that at least one application is an application affected by the error in the configured input/output device. In other words, the application determination device may identify in the control device the type of the at least one application to be replaced.

An error detection device enables a detection of the unconfigured system and its commissioning as well as error elimination. The error detection device may identify the available or predetermined applications on the configured input/output device and pass this information to the application determination device, so that the necessary applications may be provided.

According to another embodiment, the control device further comprises a connection determination device. The connection determination device may be adapted for re-routing a connection leading to the configured input/output device to the originally unconfigured input/output device. For example, a connection may connect an application to a peripheral device and/or to another application. A connection may be a virtual connection.

A re-routing, i.e., a re-arrangement of connections, may be carried out within the network. In this way, sensors or actuators or general peripheral devices may be connected to the respectively allocated or associated application. As, in the event of an error, a migration of at least one application from a configured system to an unconfigured device may take place, it may also be necessary to re-route the connections leading to the initially configured input/output device to the initially unconfigured and now newly configured input/output device. In the case of a migration, an application may be carried out on a different hardware component and/or at a different place than prior to the migration. A migration may be linked to the uploading of an application onto a hardware component. With the help of the connection determination device the peripheral devices may again be connected to the respective applications.

According to yet exemplary embodiment, the re-routing of a connection may be carried out depending on a priority of an application related to the connections. The priority may be determined by at least one of the criteria selected from the group of criteria comprising the criticality of an application, the signal propagation time, the signal delay time or latency and the number of processing stages. When re-routing connections, it may happen that a connection relating to a critical application is routed via heavily loaded or slow nodes. For this reason, taking into account of the load or the latency time of a node, or of the number of intermediary nodes situated between the periphery and the input/output device may allow for providing for a reaction time or quality of service.

According to yet another embodiment, the connection determination device may be adapted for communicating with a connection switching device for re-routing the connection. For the communication between the connection switching device and the control device, a communication channel may be established between the connection switching device and the control device, through which channel, information, for example relating to the signal propagation time or the loading of a node, may be exchanged.

According to yet another embodiment, the control device may be adapted for operating at an aircraft-specific infrastructure, such as for example, an aircraft-specific power supply. Furthermore, the device may also be configured for operating an aircraft-specific network, such as for example, an ARINC 429 or an ARINC 629 or an AFDX (Avionic Full Duplex Network). In particular, a digital and/or an analogue connection of peripheral components such as sensors may be distinguished. The control device may be prepared for the connection of aircraft-specific sensors. Therein, the peripheral components may be connected in all possible ways to the control device or to the aircraft network. Therefore all types of data may be supported. The nature of the data transmission, for example, from the sensors may be analogue, digital (ARINC 429, ARINC 629 etc.) or in any other form. The communication of the CPIOMs with the switches, the IOMs, the SSNMS and the other network components may take place via AFDX according to an embodiment. In other words, for example peripheral devices, such as sensors may be connected to the network digitally and/or in analogue form, the internal network communications may take place via AFDX. A power supply for an aircraft may be a 28V direct current supply.

An Integrated Modular Avionics (IMA) or a next generation IMA may be implemented. IMA may be another name for an aircraft network. The input/output device or CPIOM may comprise a pin programming or a pin coding as an identification device or in an identification device. The pin coding, that is to say an individual arrangement of pins, allows for the type of an input/output device or for input/output device and thus for the related application or an application identifier to be identified. The pin coding or the pin programming, that is to say, programming through a pin code, enables the control device to determine the applications that relate to the unconfigured input/output device. Pin programming may determine an address for an input/output device. A pin coding may constitute an individual labelling for an input/output device.

According to a further embodiment, the second identification device or the further identification device may comprise a port, through which the connected input/output device may be identified. Through this port, for example, the individual labelling for the input/output device that is connected to the port may be determined According to yet another embodiment, the connection switching device may comprise a memory device. The memory device comprises a dynamic memory range for the storage of virtual connections. By separating a dynamic memory range from a fixed memory range, a dynamic routing of virtual connections or of virtual links may be carried out.

It should be noted that different are described in relation to different subjects. In particular, certain embodiments were described in relation to device-type claims, while other aspects were described in relation to method-type claims. However, from the previous description and from the description that follows, unless it is described differently, a person skilled in the art would understand that in addition to any combination of features relating to one category of subjects also any other combination of features relating to different categories of subjects is disclosed by this text. In particular, combinations of features concerning a device-type claim and features concerning a method-type claim are disclosed.

This and other embodiments may be described further in relation to the embodiments described below. Below, embodiments are presented with reference to the drawings.

BRIEF DESCRIPTION OF THE DRAWINGS

The illustrations in the drawings are schematic and are not to scale. In the following description, the same reference numerals are used for the same or corresponding elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1A:
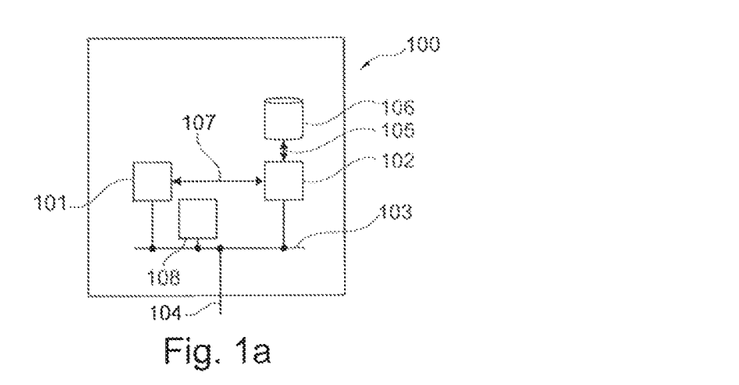
FIG. 1a shows a block diagram of a control device according to an embodiment.

FIG. 1a shows a block diagram of a control device 100, comprising the application determination device 101 and the application provision device 102. The application determination device 101 and the application provision device 102 are connected by an internal bus 103 and may access the external connection or the interface 104. Not shown in FIG. 1a is the aircraft network or AFDX network, with which the control device 100 or the SSNMS 100 (Software Storage and Network Management Server) is connected to the interface 104. In the event of a new connection of an input/output module (not shown in FIG. 1a) or CPIOM, the application determination device allows for a determination of the applications that relate to the respective CPIOM. For this purpose, the application determination device determines the type of the CPIOM and may provide the determined type of application provision device 102.

By way of the internal link 105, the application provision device 102 may access the data base 106, in which both the allocation of a CPIOM to corresponding applications and the program code of the respective application are stored. That is to say, the data base 106 also provides a program library, which may be read out by the application determination device via the internal link 105 and may be made available via the internal bus 103 and the external interface 104 to the associated CPIOM.

For identification purposes, the CPIOM may have a distinct address or a distinct identifier, by way of which the control device 100 or the SSNMS 100 may identify the CPIOM and may determine an application associated to it. The application provision device 102 may thus provide a program from the data base 106, which corresponds to at least one application which was identified as being associated to the CPIOM. The application provision device 102 may actively upload the corresponding programs actively onto the identified CPIOMs by way of program uploading mechanisms, as for example FTP (File Transfer Protocol). Communication between the application determination device 101 and the application provision device 102 is shown by the double arrow 107.

The control device 100 may further comprise the error detection device 108, which is also connected to the internal bus 103. The control device may also be constructed to be redundant and may for example be present at least in duplicate. Due to the redundant layout of the control device, the failure of one of the at least two control devices may be tolerated.

With the help of the error detection device does not only an unconfigured input/output device and its associated software may be determined It is also possible to determine a malfunctioning or a defective configured input/output device and identify one or more applications relating to the configured input/output device and upload these as a copy onto a redundant unconfigured input/output device. In other words, with the error detection device an error may be detected and the application determination device 102 may be controlled in such a way that the application determination device 102 does not just produce a new configuration of an unconfigured input/output device, but also produces a copy of a failed configured input/output device. The applications can be uploaded onto the input/output device in the form of an image.

Two operating modes may be distinguished inside the control device 100, which modes may be switchable by a switch (not shown). The first operating mode may provide an intelligent plug-and-play mechanism, in other words it may provide an intelligent configuration service. With this plug-and-play mechanism an intelligent IMA system may be realised. The plug-and-play operating mode or the configuration operation mode may be of interest for maintenance work or also in the case of system failures.

The plug-and-play mechanism or the automatic CPIOM detection and the automatic software installation may be activated when a new CPIOM is installed in a network and the system is re-started. By way of appropriate trigger mechanisms, an unconfigured CPIOM or an unconfigured input/output device may signalize to the control device 100, that it is there and that it may be automatically configured by software.

In a second operating mode, the system may automatically repair and re-configure itself, with the repair and re-configuration being quickly effected. The repair and configuration may be carried out by an operator or by the system itself, in other words it is carried out substantially autarkic.

As an unconfigured input/output device is employed, which is only configured as the need arises, it may not be necessary for a number of different part numbers to exist for an input/output device or for a CPIOM. Storage of replacement parts may be reduced by the omitting of several different part numbers for pre-configured CPIOMs and the risk of faulty parts being present in storage may be reduced.

Figure 1B:
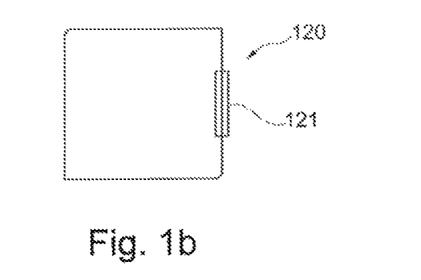
FIG. 1b shows a block diagram of an input/output device for an aircraft network according to an embodiment.

FIG. 1b shows an exemplary embodiment of an input/output device 120 or a CPIOM 120. The CPIOM comprises a first identification device 121, which is adapted for passing on at least one application (not shown in FIG. 1b) running on the input/output device to a control device 100 (not shown in FIG. 1b). The identification device 121 may comprise a pin coding. By way of the pin coding, a pin programming may be carried out on the back side or on the back plane of a rack, to which the input/output device 120 is connected by way of the identification device 121. The identification device 121 may be designed in the form of a plug and act as an interface between the input/output device 120 and a rack, into which the input/output device is plugged.

A connection to the aircraft network may be established by the interface 121, so that the input/output device 120 and the control device 100 may establish contact via the aircraft network. The identification device 121 may be adapted in such a way that, with a restart or a reset of the input/output device 120, a trigger, a request notification or a request signal may be sent to a respective control device 100, so that the system of the SSNMS 100 may detect a newly installed input/output device 120 or a newly installed CPIOM and automatically upload software, in particular an appropriate software, onto the input/output device 120.

Figure 1C:
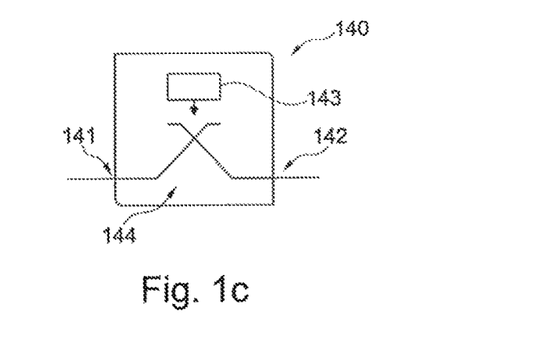
FIG. 1c shows a block diagram of a connection switching device according to an embodiment.

The identification device 121 may also be connected to a connection switching device 140, shown in FIG. 1c, or to an AFDX switch 140. For the connection, the AFDX switch 140 may provide ports 141, 142. The ports 141, 142 may serve as an interface for the switch 140. By way of a port 141, the connection switching device 140 together with a second identification device 143 may determine the type of the input/output device 120 (not shown in FIG. 1c). The second identification device 143 may be adapted for determining the type of an input/output device which is connected to the connection switching device 140. By way of the switching network 144, the connection switching device may interconnect, for example via virtual connections, a plurality of input/output devices 120, which are connected to the ports 141, 142. Similarly, the switch 140 may establish a connection to a connected SSNMS 100 (equally not shown in FIG. 1c). For establishing the connection with the SSNMS either the existing network may be used or a separate data configuration line may be provided between SSNMS 100 and switch 140. The gates or interfaces 104, 121, 141, 142 may all correspond to the same standard, according to an embodiment. An example for a standard of interfaces may be AFDX.

The intelligent "plug-and-play" IMA system, which may be built up by the control device 100, the input/output device 120 and the connection switching device 140, may allow for an intelligent error treatment while the aircraft is in operation. For example, in the event of the failure of a complete CPIOM 120 or a complete input/output device 120, the intelligent network 200, which if formed by at least one switch 140, may make use of a CPIOM 120, which, although unconfigured, is already installed in the network.

Figure 2:
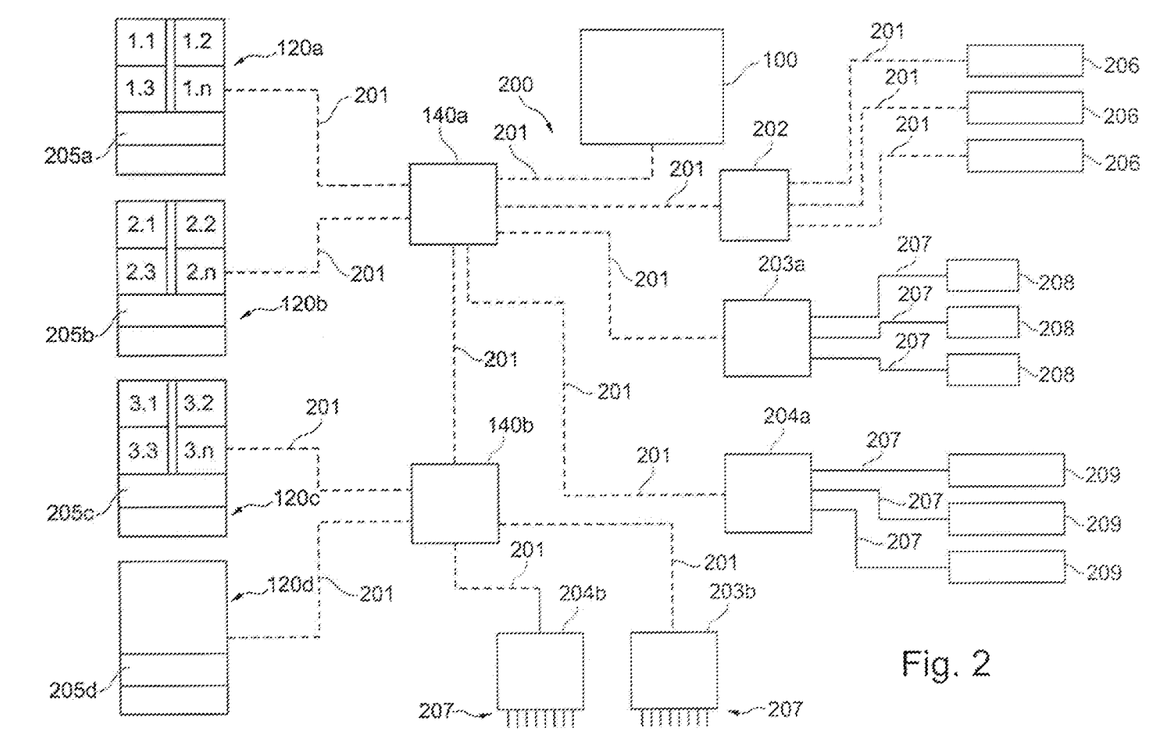
FIG. 2 shows an aircraft network system in an error-free condition according to an embodiment.

The flow of the error recognition and error correction in an aircraft network 200 is shown in FIG. 2, FIG. 3, FIG. 4, and FIG. 5. FIG. 2 shows the SSNMS 100, which is connected to the aircraft network 200 or to the AFDX network 200. The AFDX network 200 comprises the physical AFDX links 201, which connect the AFDX switches 140a, 140b to other components. The AFDX network 200 is a digital network. The AFDX network 200 forms an aircraft control system 200.

The AFDX switches 140a, 140b are connected to the central SSNMS 100, the input/output devices 120a, 120b, 120c, 120d, the micro switch 202, the cRDCs (Common Remote Data Concentrator) 203a, 203b and the IOMs (input/output modules) 204a, 204b. The CPIOMs 120a, 120b, 120c, 120d contain the same basic software, core software or firmware 205a, 205b, 205c, 205d. The first three CPIOMs 120a, 120b, 120c shown in FIG. 2 are already configured input/output devices 120a, 120b, 120c, each of which contains four applications.

The applications are numbered in sequence using a numerical code. The numerical code may be regarded an application identifier. For example, CPIOM1 120a comprises the applications 1.1, 1.2, 1.3 to 1.n, where n may represent any natural number that corresponds to the number of applications installed on a CPIOM or to the plurality of installed applications. The second CPIOM, CPIOM2 120b, correspondingly comprises the four applications 2.1, 2.2, 2.3 and 2.n, the third CPIOM, CPIOM3 120c correspondingly comprises the four applications 3.1, 3.2, 3.3 and 3.n.

The applications of the configured CPIOMs 205a, 205b, 205c may be redundant applications. In this way, for example, the applications 1.1, 2.2 and 3.3 may correspond to each other and in the event of a failure they may replace each other. The use of redundant applications makes possible that, if for example the third CPIOM module 120c fails, module 1.1, 2.2 is still available several times. An application may for example be the control of a landing flap. The fourth CPIOM, CPIOM4 120d, is substantially an unconfigured CPIOM, a replacement CPIOM or a spare CPIOM 120d. That means that, apart from the basic software 205d, the reserve CPIOM or the spare CPIOM comprises no application.

The intelligent sensors 206 or the smart sensors 206 are also connected to the micro switch 202 via digital links, for example AFDX links 201. By way of analogue lines 207, ARINC (Aeronautical Radio Incorporated) lines 207 or CAN (Controller Area Network) lines 207, sensors 208 or sensors 209 or actuators 209 are connected at the cRDCs 203a, 203b to the IOMs 204a, 204b. The peripheral devices 206, 208, 209 may be connected to the AFDX network 200 via the micro switch 202, the cRDCs 203a, 203b and the IOMs 204a, 204b.

Figure 3:
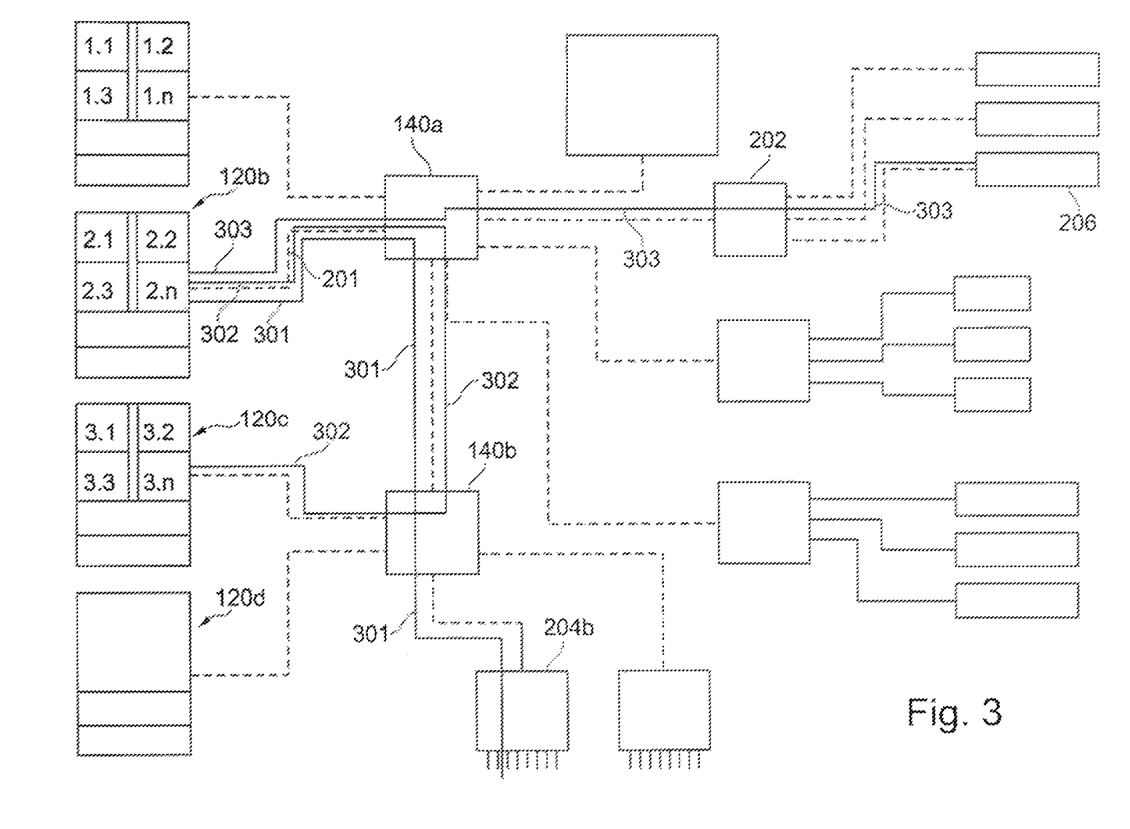
FIG. 3 shows the aircraft network system according to FIG. 2, with three virtual connections according to an embodiment.

FIG. 3 shows three virtual links 301, 302 and 303. The first virtual link 301 leads via the physical AFDX link 201, in parallel to the second and third virtual link, and connects the second CPIOM 120b via the AFDX switches 140a, 140b to a sensor (not shown) or actuator 209 at a second IOM 204b. The second virtual link is also routed via the two AFDX switches 140a, 140b and connects the second CPIOM 120b with the third CPIOM 120c and in particular two applications. The third virtual link 303 leads firstly via the first AFDX 140a and the micro switch 202 to one of the smart sensors 206. The unconfigured and redundant CPIOM 120s is not in use and is available in the event of a failure as a so-called 1:N redundancy. Therein, N denotes the number of devices or of applications for which the CPIOM 120d may act as a replacement.

Figure 4:
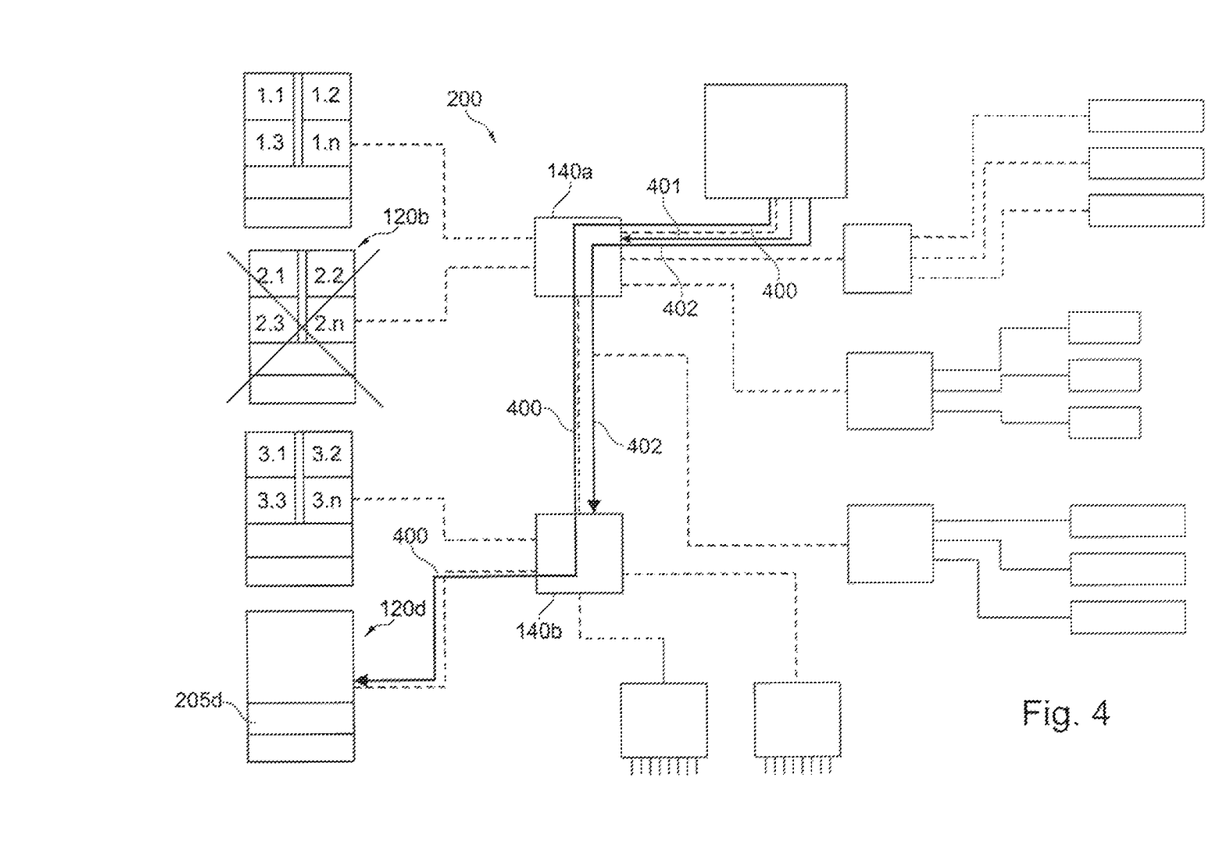
FIG. 4 shows an aircraft network system with a failed input/output device according to an embodiment.

FIG. 4 shows the aircraft network system 200 just after the second CPIOM 120b has failed. The SSNMS identifies the defective second CPIOM 120b. The smart and intelligent network 200, and in particular the SSNMS 100, which administers the network control function, tries to use the redundant replacement CPIOM 120d, which has already been installed on the aircraft network 200. The COIOM 120d is usable because the standard software or the basic software 205d has already been installed on it. However, the redundant CPIOM 120d has not been loaded with any application programs. However, the basic software 205d may provide an interface, which may be used by the application.

The network 200, in particular the SSNMS 100, detects the second CPIOM 120b, which is affected by the failure, and also detects the software applications 2.1, 2.2, 2.3 and 2.n originally installed on the CPIOM 120b. As indicated by the arrow 400, the SSNMS 100 firstly tries to load the identified applications 2.1, 2.2, 2.3 and 2.n of the second CPIOM 120b onto the still unconfigured CPIOM 120d. The flexible loading of the applications may increase the reliability of the aircraft system 200, which comprises the system components 100, 120a, 120b, 120c, 120d, 140a, 140b, 202, 203a, 204a, 203b, 204b and the links 102.

Once the applications have been loaded onto the replacement CPIOM 120d, the SSNMS determines the new connections for the virtual links 301, 302 and 303. The SSNMS 100 is connected to the AFDX switches 140a, 140b by the control channels 401, 402 and exchanges routing information, i.e., information on the progress of the new virtual connections 301', 302', 303'. A control channel may be designed as a separate line. A control channel may also be understood as being a communication via an AFDX line or a communication in an AFDX network.

Figure 5:
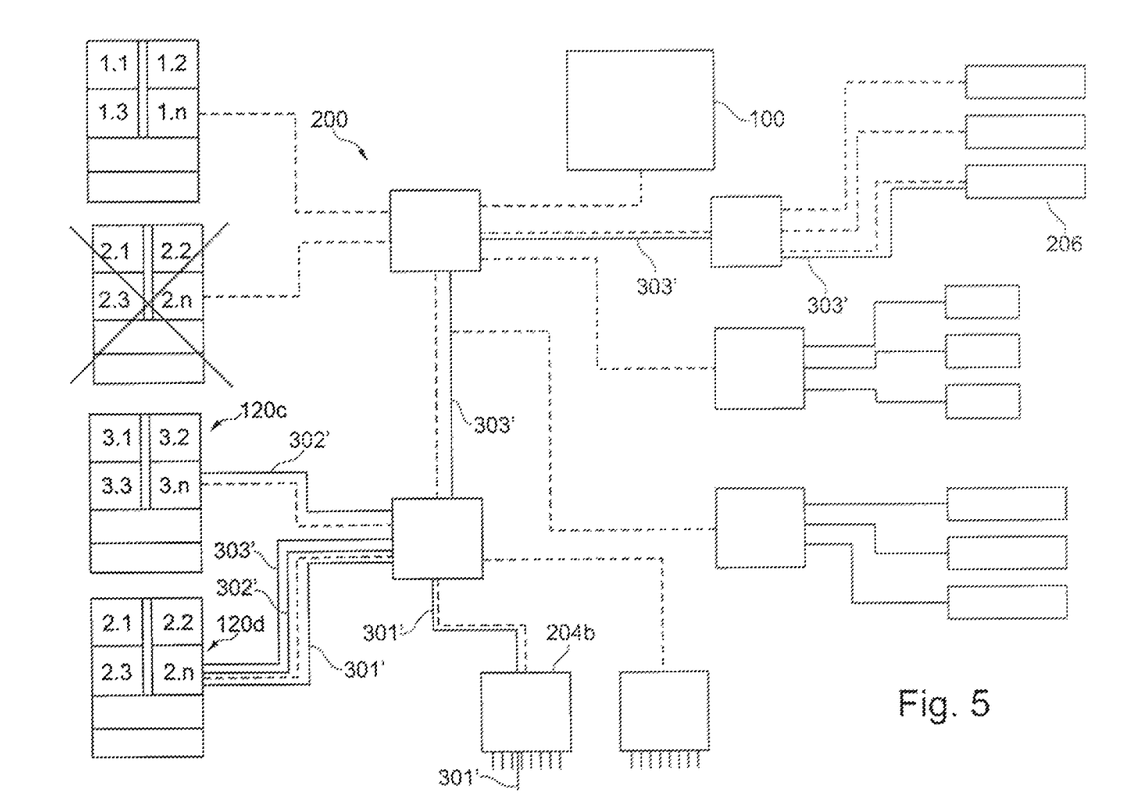
FIG. 5 shows an aircraft network system after a restoring of the redundancy according to an embodiment.

In this way, the new or re-routed virtual connections 301', 302' and 303' shown in FIG. 5 may result, which connections now connect the third CPIOM 120c to the fourth CPIOM 120d, the second IOM 204b to the forth CPIOM 120d and the smart sensor 206 to the fourth IOM 120d. The newly configured fourth CPIOM 120d now comprises the applications 2.1, 2.2, 2.3 and 2.n of the originally second CPIOM. In this way, a re-configuration has taken place, which this has substantially not affected the peripheral devices. An assignment of corresponding sensors or of peripheral devices to the applications 2.1, 2.2, 2.3 and 2.n may still be established.

In other words, the plug-and-play-IMA architecture may comprise IMA components and the SSNMS 100. The plug-and-play IMA aircraft network system comprises the cRDC 203a, 203b, the CPIOMs 120a, 120b, 120c and at least one replacement CPIOM 120d. Furthermore, the aircraft network 200 comprises the IOMs 204a, 204b, the AFDX switches 140a, 140b, the micro switch 202 and the SSNMS 100. The use of a substantially unconfigured CPIOM 120d may allow avoiding that different CPIOMs or input/output boards, which are arranged at certain positions and carry out fixed functions of the CPIOM, have to be used. In this way, the number of part numbers for a CPIOM 120a, 120b, 120c, 120d may be reduced. The plug-and-play CPIOMs 120a, 120b, 120c, 120d, which may be configured and loaded by an SSNMS 100, may be realised as digital CPIOMs. Therein, only a single part number (P/N) may exist.

As the CPIOMs 120a, 120b, 120c, 120d are substantially completely realised as digital plug-and-play CPIOMs, the IOMs 204a, 204b and the RDCs 203a, 203b are provided which substantially collect the analogue data from the sensors 208, 209 and transmit this data digitally to the ADCN (Aircraft Data Communication Network) 200. The IMA system 200 or the ADCN 200 without plug-and-play functionality and without error correction functionality may function as a conventional IMA system and for being compatible with a conventional IMA system.

However, if a system error arises on a CPIOM 120b and is detected by the SSNMS, the SSNMS 100 loads the affected and lost system software 2.1, 2.2, 2.3, 2.n onto the replacement CPIOM 120d via the ADCN 200. In parallel with the transfer of the software or the programs by the SSNMS 100 to the unconfigured CPIOM 120d, the switches 140a, 140b are updated or configured with information on the newly to be established virtual links or virtual connections 301', 302', 303'. Updating the switches 140a, 140b may be carried out in a specific dynamic software area of the switches 140a, 140b or in a special dynamic software area of the connection switching devices 140a, 140b, which is separate from the static path information or the static routing information.

The dynamic routes 401, 402 of the virtual links 301', 302', 303' may be carried out taking into account certain priority requirements. The newly to be established virtual links 301', 302', 303' should be configured in such a way that overload situations are avoided on the individual switches 140a, 140b. The traffic load on the switches 140a, 140b is established at the design stage. In particular, an upper limit for the maximum acceptable traffic load for each switch 140a, 140b is fixed. In the event of a new configuration or a re-configuration because of a system error or a failure of a CPIOM, the network, and in particular the SSNMS 100, knows value of the free switching capacity of the connection switching device 140a, 140b in each of the connection switching devices. This traffic load may be taken into account by the SSNMS 100 when re-routing or re-locating the virtual links so that Mission Critical Application may still be carried out in real-time.

In addition to the load, also the delay time or the latency time of the virtual links 301', 302', 303' may be in accordance with the requirements of the system concerned. For example, data relating to flight-critical applications, such as the operation of landing flaps, have to use the shortest possible route through the network 200, in order to enable the data, particularly the speed of exchanging data, within the required response time to be ensured. In other words, the SSNMS may be adapted in such a way that particular criticality requirements of aircraft systems, such as for example, landing flaps, tail unit or chassis may be taken into account.

Data relating to an application classified as non critical may take a longer path through the network 200 or accept a longer delay time through a greater number of switches 140a, 140b than data relating to flight-critical applications. Longer virtual connections or a greater number of switches to be passed or longer delay times may lead to longer response times. The SSNMS 100 may administer a priority list, in which the maximum acceptable response times for the applications 2.1, 2.2, 2.3 2.n are listed. After the re-configuration, the system 200 functions substantially in the same way as before the failure of the CPIOM 120b. The failure of a single system may substantially imply no limitations of the flight operation.

The SSNMS may also determine the procedure to be followed for the repair of a defective CPIOM 120b. It may use the newly configured CPIOM 120d as a standard CPIOM and then return the repaired CPIOM 120b or exchanged CPIOM 120b into the system as a replacement CPIOM. The configuration of a newly installed CPIOM functions substantially in the same way as error correction, wherein the error detection may be omitted. The control device 100, the input/output device 120 and the connection switching device 140 may be designed as plug-in cards for a rack system for use in an aircraft.

The criticality may denote how important or how indispensable a certain system may be for the operation of an aircraft. A system, whose failure may lead to serious consequences, may comprise a higher criticality than a system whose failure may lead to less serious consequences. Thus, for example, the failure of an on-board entertainments system is less critical than the failure of a navigation device. The criticality may provide a priority which may be taken into account when uploading replacement applications in the event of a failure of a CPIOM 120b. Criticality or priority may be provided by a flight safety authority.

Figure 6:
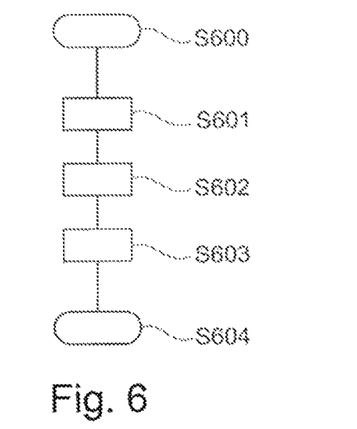
FIG. 6 shows a flow diagram for a method for controlling an aircraft network according to an embodiment.

FIG. 6 shows a flow diagram for a method for controlling an aircraft network 100 in according to an embodiment. In step S600 the system, for example an SSNMS 100, is in an idle state. In step S601, the control device detects an unconfigured input/output device 120d in the aircraft network 200. An unconfigured input/output device 120d may be detected in the network, because either a new installation has been effected or because a system component has failed.

The method may then provide for the determination of at least one application that is to be installed on the unconfigured system 120d. In the event of a new installation, a reference may be established, by addressing, from an input/output device to an associated application. In the event of a re-configuration when a failure occurs, the application may be determined by a failed application and/or its criticality.

In step S602, a program relating to the identified application is provided, which program corresponds to the identified application and which may be uploaded in step S603 onto the input/output device. In step S604, the system is again in an idle mode.

Figure 7:
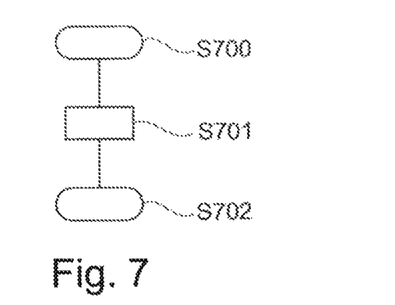
FIG. 7 shows a flow diagram for a method for identifying an input/output device according to an embodiment.

FIG. 7 shows a method for identifying an input/output device by the input/output device. In step S700 the input/output device may be in an idle mode. In step S701, the input/output device communicates at least one application, which is running or has run on the input/output device, to the control device 100 or to the connection switching device 140a, 140b. The communication may be initiated by a query or by an active error or start detection. In step S702, the input/output device is again in an idle mode.

Figure 8:
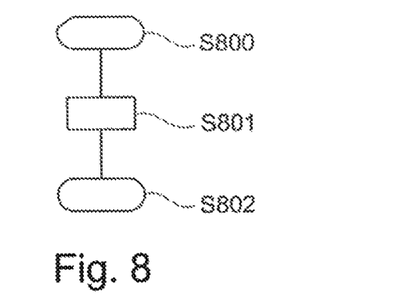
FIG. 8 shows a flow diagram for a method for identifying an input/output device in a connection switching device according to an embodiment.

FIG. 8 shows a flow diagram for a method for identifying an input/output device in a connection switching device. The method starts in step S800 in an idle mode. In step S801, the connection switching device 140 detects a connected input/output device. In particular, the connection switching device detects the type of the connected input/output device. For the detection, the connection switching device 140 may carry out a port query, where an association of the port and a respective type of input/output device 120 are stored in the connection switching device. The connection switching device may communicate the type of the connected input/output device to the control device 100. In step S802, the method is again in an idle mode.

Additionally, it should be noted that the terms "having" and "comprising" do not exclude other elements or steps and that "a" and "an" does not exclude a plurality. It should also be noted that features or steps, described with reference to one of the above embodiments, may also be used in combination with other features or steps of other embodiments described above. In addition, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A control device for an aircraft network, comprising:
    an application determination device that is configured to during a flight:
        detect an unconfigured input/output device in the aircraft network; and
        determine an application relating to the unconfigured input/output device;
    an application provision device that is configured to:
        provide a program that corresponds to the application; and
        upload the program onto the unconfigured input/output device during the flight such that the application is running on a hardware layer of the input/output device; and
    a connection determination device that is configured to re-rout a connection that led to a configured input/output device to an originally unconfigured input/output device by determining a priority based at least in part on a criticality of the application, wherein the re-routing of the connection takes place depending on the priority of the application relating to the connection.

2. The control device according to claim 1, further comprising:
    an error detection device that is configured to detect an error in the configured input/output device,
    wherein the application determination device is further configured to determine the application such that the application is an application affected by the error in the configured input/output device.

3. The control device according to claim 1, wherein the priority is determined by a signal propagation time.

4. The control device according to claim 1, wherein the priority is determined by a number of processing stages.

5. The control device according to claim 1, wherein the connection determination device is configured to communicate with a connection switching device to re-route the connection.

6. The control device according to claim 1, wherein the control device is configured for operation at an aircraft-specific power supply.

7. A method for controlling an aircraft network during a flight, comprising:
    detecting an unconfigured input/output device in the aircraft network with a control device;
    determining an application that relates to the unconfigured input/output device with the control device;
    providing a program that corresponds to the application with the control device;
    uploading the program onto the unconfigured input/output device during the flight such that the application is running on a hardware layer of the input/output device;
    re-routing a connection that led to a configured input/output device to an originally unconfigured input/output device; and
    determining a priority based at least in part on a criticality of the application, wherein the re-routing of the connection takes place depending on the priority of the application relating to the connection.

8. The method according to claim 7, further comprising:
    detecting an error in a configured input/output device with an error detection device; and
    determining the application such that the application is an application affected by the error in the configured input/output device.

9. The method according to claim 7, wherein the priority is determined by a signal propagation time.

10. The method according to claim 7, wherein the priority is determined by a number of processing stages.

11. The method according to claim 7, wherein the re-routing the connection comprises communicating with a connection switching device.

12. The method according to claim 7, further comprising operating the control device at an aircraft-specific power supply.

13. A non-transitory computer readable medium embodying a computer program product, said computer program product comprising:
    a control program for controlling an aircraft network during a flight, the control program configured to:
    detect an unconfigured input/output device in the aircraft network with a control device;
    determine an application that relates to the unconfigured input/output device with the control device;
    provide a program that corresponds to the application with the control device;
    upload the program onto the unconfigured input/output device during the flight such that the application is running on a hardware layer of the input/output device;
    the control program further configured to re-rout a connection that led to a configured input/output device to an originally unconfigured input/output device; and
    determine a priority based at least in part on a criticality of the application, wherein the re-routing of the connection takes place depending on the priority of the application relating to the connection.

14. The non-transitory computer readable medium embodying the computer program product according to claim 13, the control program further configured to:
  detect an error in the configured input/output device with an error detection device; and
  determine the application such that the application is an application affected by the error in the configured input/output device.

* * * * *